United States Patent [19]

Onodera

[11] 4,367,596
[45] Jan. 11, 1983

[54] DRYING APPARATUS

[76] Inventor: Hirohumi Onodera, 340, Mizuhai Higashiosaka-shi, Osaka-fu, Japan

[21] Appl. No.: 158,388

[22] Filed: Jun. 11, 1980

Related U.S. Application Data

[63] Continuation of Ser. No. 966,752, Dec. 5, 1978, abandoned.

[30] Foreign Application Priority Data

Apr. 17, 1978 [JP] Japan .............................. 53-52438[U]
Sep. 1, 1978 [JP] Japan ............................ 53-120854[U]

[51] Int. Cl.³ ............................................. F26B 13/00
[52] U.S. Cl. ........................................ 34/147; 34/155; 198/778
[58] Field of Search ......................... 34/147, 164, 155; 198/778

[56] References Cited

U.S. PATENT DOCUMENTS

| 3,133,798 | 5/1964 | Feld et al. | 34/147 |
| 3,348,659 | 10/1967 | Roinestad | 34/147 |
| 3,412,476 | 11/1968 | Astrom | 34/147 |
| 3,742,614 | 7/1963 | Bettermann et al. | 34/164 |

Primary Examiner—Larry I. Schwartz
Attorney, Agent, or Firm—Wenderoth, Lind & Ponack

[57] ABSTRACT

A drying apparatus includes a rotary drum having a vertical axis and adapted for one-way revolution. A conveyor is spirally wound round the rotary drum and driven thereby. A casing covers the conveyor, with a chamber provided between the inner surface of the casing and the outer side of the conveyor, and the casing surrounding the whole or a part of the circumference of the conveyor. Hot blast is supplied to the chamber. Blast pipes connected to the chamber blow the hot blast upon the upper and lower surfaces of the conveyor.

7 Claims, 4 Drawing Figures ns of application Ser. No. 966,752, filed Dec. 5, 1978 now abandoned.

DRYING APPARATUS

This is a continuation of application Ser. No. 966,752, filed Dec. 5, 1978 now abandoned.

BACKGROUND OF THE INVENTION

The present invention relates to a drying apparatus in which articles placed on a conveyor on its feed side are dried (or cooled as occasion demands) while they are moved toward the delivery side of the conveyor.

An object of the present invention is to provide a drying apparatus in which the articles to be dried are uniformly exposed to a hot blast (or cold blast).

BRIEF DESCRIPTION OF THE DRAWINGS

This and other objects will become apparent from the following detailed description, with reference to the accompanying drawings, in which.

DETAILED DESCRIPTION OF THE INVENTION

Figure 1:
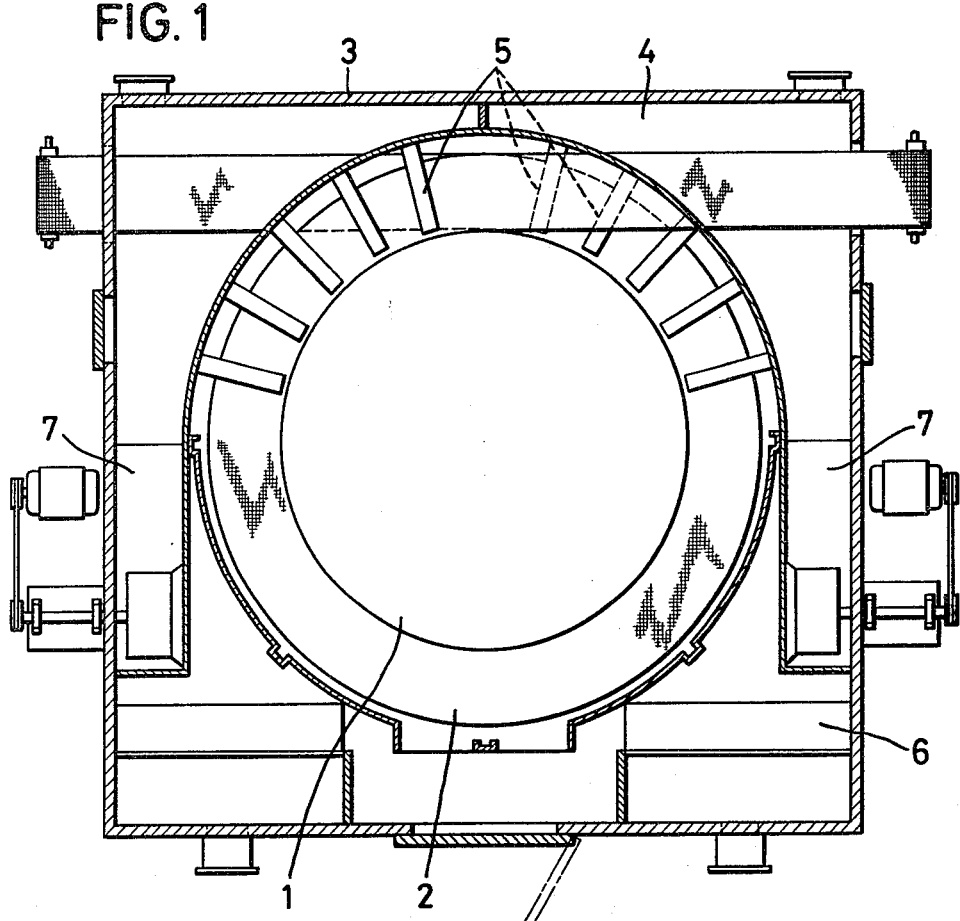
FIG. 1 is a horizontal sectional plan view of an apparatus according to the present invention.
Figure 2:
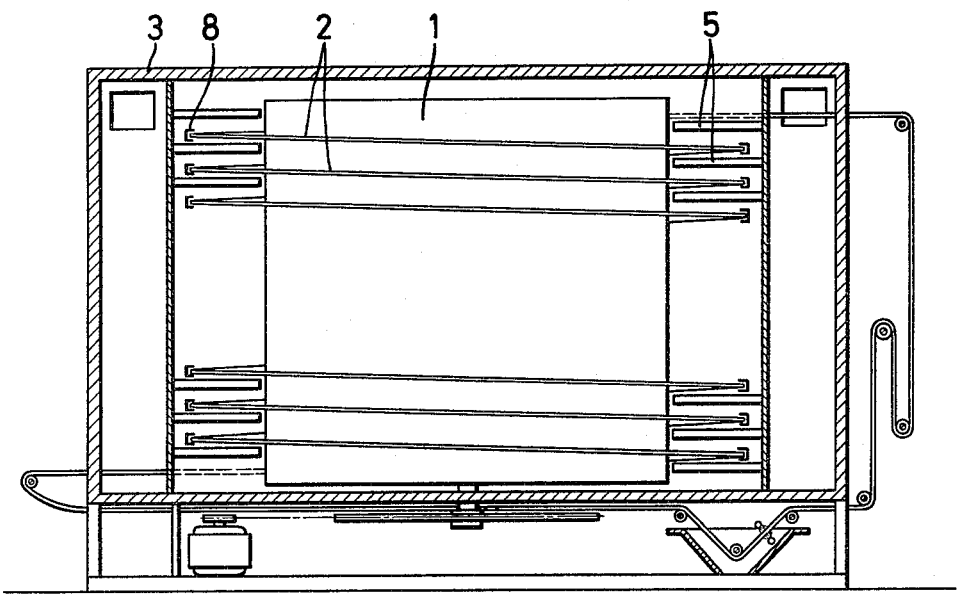
FIG. 2 is a longitudinal sectional front view thereof.

Referring now to FIG. 1, a drying apparatus in accordance with the present invention includes a rotary drum 1 having a vertical axis and adapted for one-way revolution, a conveyor 2 which is spirally wound round the rotary drum 1 and driven thereby, a casing 3 covering the conveyor 2, a chamber 4 provided between the inner surface of the casing 3 and the outer side of a wall which surrounds the whole or a part of the circumference of the conveyor 2, a means 6 for supplying the hot blast to the chamber 4, and blast pipes 5 connected to the chamber 4 and adapted for blowing the hot blast upon and toward the upper and lower surfaces of the conveyor 2. In the upper and lower surfaces of each blast pipe 5 there are provided slits, small holes or nozzles for blowing off the hot blast and extending parallel to the axis of the rotary drum 1. In FIG. 1, the circumference of the conveyor 2 is surrounded only partially by the chamber 4, and the hot blast produced by a heater 6 is supplied to the chamber 4 by means of a fan 7.

The means for driving the conveyor 2 comprises tooth-shaped members (not shown) provided parallel to the axis of the rotary drum 1 on the cylindrical surface thereof. The conveyor 2 comprises nets connected by means of links. Each of these links are provided with a projecting portion which fits in between the tooth-shaped members on the cylindrical surface of the rotary drum 1.

The outer edge of the conveyor 2 fits in guide rails 8.

The conveyor 2 protrudes out of the casing 3 in two places, either one of which may be allotted for the feed of articles to be dried and the other for the delivery thereof. The casing 3 is made of a heat insulating material so as to minimize heat loss.

The blast pipes 5 are vertically lined up so that each conveyor net may be subjected to the equal pressure of the hot blast from above and from below and thereby the articles on the conveyor nets may be prevented from being set afloat.

The above-mentioned construction of a drying apparatus in accordance with the present invention permits articles placed on the conveyor 2 on its feed side to be dried by exposure to the hot blast blown off from the blast pipes 5 while the articles are moved toward the delivery side of the conveyor 2.

In order to equalize the injection pressure of the hot blast to be blown off from the blast pipes 5, the hot blast is first supplied to the chamber 4 and then is fed to each blast pipe 5 at an equal pressure. The arc-shaped wall of the chamber 4 facing the outer edge of the conveyor 2 serves to minimize heat loss.

Figure 4:
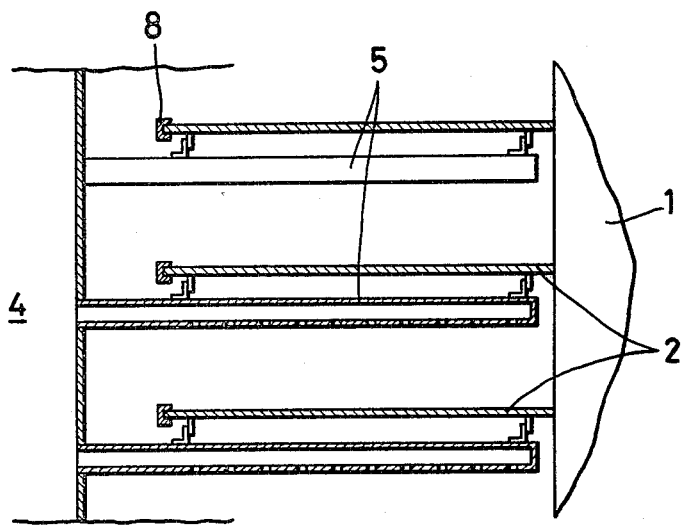
FIG. 4 is an enlarged view of a part of another embodiment of the present invention.
Figure 3:
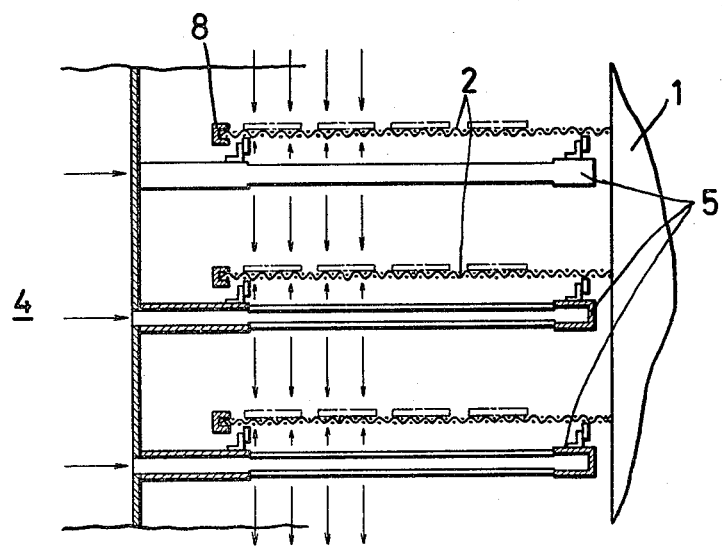
FIG. 3 is an enlarged view of a part of FIG. 2.

Improved efficiency of drying is provided by an apparatus in accordance with the present invention, because the articles are subjected to the injection of the hot blast both from above and from below. For the purpose of drying thin articles, the apparatus can be adapted to blow the hot blast only from above. This can be effected by providing slits, small holes or nozzles for blowing off the hot blast only on the lower surface of each blast pipe 5, as shown in FIG. 4.

While I have disclosed certain embodiments of the present invention, it is to be understood that these embodiments have been given by way of example only and not in a limiting sense, the scope of the present invention being determined by the object and the claims.

what are claimed are:

1. A drying apparatus comprising:

a casing made of a heat insulating material;

a rotary drum mounted within said casing for rotation about a vertical axis;

an endless conveyor spirally wound about said rotary drum and rotatable therewith, said conveyor being in the form of plural, vertically spaced convolutions;

a vertically extending wall transversely surrounding at least a portion of the circumference of said conveyor;

said casing and said wall defining therebetween an enclosed chamber which surrounds at least a portion of the circumference of said conveyor and which is partitioned into at least two pressure compartments and a suction compartment;

means for supplying hot blast under pressure into each of said pressure compartments such that the pressure of said hot blast within all portions of said each of said pressure compartments is equalized, each of said pressure compartments being individually provided with a separate respective one of said supplying means;

means for injecting said hot blast from said pressure compartments through said wall and for directing said hot blast at equal pressure vertically directly against plural surfaces of said conveyor, said injecting and directing means comprising a plurality of blast pipes extending inwardly from said wall in directions radially of said axis of said rotary drum and orthogonally of said convolutions of said conveyor, said blast pipes having therein openings directed vertically toward said surfaces of said conveyor, whereby said hot blast passes, at equal pressure, from said chamber through said plurality of blast pipes and is discharged therefrom through said openings therein in vertical directions against said surfaces of said conveyor, said blast pipes being arranged between adjacent said convolutions, such that each said convolution has blast pipes directing said hot blast directly thereagainst; and said rotary drum, said conveyor, said chamber, said means for supplying hot blast under pressure into each of said compartments, and said blast pipes being accommodated within said casing.

2. An apparatus as claimed in claim 1, wherein said openings comprise longitudinal slits in said blast pipes.

3. An apparatus as claimed in claim 1, wherein said openings comprise holes in said blast pipes.

4. An apparatus as claimed in claim 1, wherein said openings comprise nozzles in said blast pipes.

5. An apparatus as claimed in claim 1, wherein said openings are formed in both upper and lower surfaces of said blast pipes, thereby directing said hot blast at equal pressure both vertically upwardly and downwardly against lower and upper surfaces, respectively, of vertically adjacent convolutions of said conveyor.

6. An apparatus as claimed in claim 1, wherein said openings are formed only in lower surfaces of said blast pipes, thereby directing said hot blast vertically downwardly against upper surfaces of said convolutions of said conveyor.

7. An apparatus as claimed in claim 3, wherein each said pressure compartment extends vertically throughout the entire height of said vertically extending wall.

* * * * *